(12) United States Patent
Ray

(10) Patent No.: US 11,736,323 B2
(45) Date of Patent: Aug. 22, 2023

(54) SYSTEM AND METHOD USING ADJUNCT SIGNALS TO INCREASE WIDEBAND RECEIVER PERFORMANCE

(71) Applicant: The Boeing Company, Chicago, IL (US)

(72) Inventor: Gary A. Ray, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 142 days.

(21) Appl. No.: 17/397,682

(22) Filed: Aug. 9, 2021

(65) Prior Publication Data
US 2022/0103403 A1 Mar. 31, 2022

Related U.S. Application Data

(60) Provisional application No. 63/085,904, filed on Sep. 30, 2020.

(51) Int. Cl.
*H04L 25/08* (2006.01)
*H04L 25/03* (2006.01)

(52) U.S. Cl.
CPC ........ *H04L 25/08* (2013.01); *H04L 25/03828* (2013.01)

(58) Field of Classification Search
CPC .... H04L 25/02; H04L 25/03828; H04L 25/08
See application file for complete search history.

(56) References Cited

U.S. PATENT DOCUMENTS 5,239,309 A 8/1993 Tang et al.
9,250,317 B1 2/2016 Wang et al.

OTHER PUBLICATIONS

Redmayne et al., "Understanding the Effect of Clock Jitter on High Speed ADCs", Linear Technology Design Note 1013, Aug. 2006.

*Primary Examiner* — Nader Bolourchi
(74) *Attorney, Agent, or Firm* — Ostrager Chong Flaherty & Broitman P.C.

(57) ABSTRACT

Systems and methods which use adjunct signals from a remote highly stable clock to enhance performance of a digital wideband receiver equipped with a less stable local clock system. The digital wideband receiver includes an analog-to-digital converter (ADC) and an adjunct receiver system connected to the output of the ADC. The adjunct receiver system includes matched filters and circuitry configured to generate an interpolation coefficient vector based on the matched filter outputs. The adjunct receiver system further includes an interpolating filter which is configured to remove jitter from the digitized samples output by the ADC using the interpolation coefficient vector.

20 Claims, 6 Drawing Sheets

SYSTEM AND METHOD USING ADJUNCT SIGNALS TO INCREASE WIDEBAND RECEIVER PERFORMANCE

RELATED PATENT APPLICATION

This application claims the benefit, under Title 35, United States Code, Section 119(e), of U.S. Provisional Application No. 63/085,904 filed on Sep. 30, 2020.

BACKGROUND

The technology disclosed herein generally relates to wideband receivers and, in particular, relates to wideband receivers that employ an oscillator to create a sample clock signal for an analog-to-digital converter (ADC).

Wideband receivers use high-rate ADCs in order to capture a wide signal bandwidth or even a direct radiofrequency (RF) down conversion to digital. This has many advantages since the receive process becomes purely digital and thus signal fidelity can be improved compared to analog methods. However, digital wideband processing requires a highly stable oscillator that creates the sample clock signal used by the ADC in order to reproduce high-signal-to-noise (high-SNR) signals across the entire bandwidth of the receiver. The problem is that for receivers with bandwidths equal to hundreds of megahertz or gigahertz, the clock stability required in order to reliably digitize high-frequency signals is difficult to achieve with ovenized (a.k.a. oven-controlled) crystal oscillators. Instead atomic clocks or other expensive and impractical solutions are used. While a highly stable (but expensive and fragile) clock could be used at certain locations, in low quantities and for particular applications, such a clock could not be used for a wide range of other applications (ones that are widespread or in difficult (vibration, acceleration, etc.) environments).

SUMMARY

The subject matter disclosed in detail below is directed to systems and methods which use adjunct signals from a remote highly stable clock to enhance the performance of a digital wideband receiver having a less stable local clock. The wideband receiver uses a sample correction algorithm to adjust the signal samples extracted from the adjunct signals. The approach adopted herein is to transmit adjunct signals based on a stable but remote clock and thereby correct the receiver digital samples. The adjunct signals are received and sampled; the samples are then processed to generate interpolation coefficients which are used to adjust the signal samples in the receiver.

In accordance with one embodiment, the digital wideband receiver includes an analog-to-digital converter (ADC) that samples received signals (including adjunct signals) and an adjunct receiver system that processes digital samples of the received adjunct signals. The adjunct receiver system includes matched filters which are matched to the known adjunct signals and processing circuitry configured to generate an interpolation coefficient vector based on the matched filter outputs. The adjunct receiver system further includes an interpolating filter which is configured to remove jitter from the digital samples of the transmitted waveforms by applying the interpolation coefficient vector.

The innovative technology described herein provides the capability to transfer a single stable clock that enables a large number of remote, maneuvering high-fidelity wideband receivers. A single high-cost, fragile stable clock is shared across a large number of wideband receivers so that the fidelity of all the receivers can be improved while still using inexpensive local clocks. This allows inexpensive and robust wideband receivers to be used in quantity and over difficult environments, while making their fidelity closely match that of wideband receivers that use highly stable and expensive clocks.

Although various embodiments of systems and methods which use adjunct signals from a remote highly stable clock to enhance performance of a digital wideband receiver equipped with a less stable local clock will be described in some detail below, one or more of those embodiments may be characterized by one or more of the following aspects.

One aspect of the subject matter disclosed in some detail below is a wideband receiver comprising: an antenna; a local clock configured to generate clock signals; an analog-to-digital converter connected and configured to convert analog signals received by the antenna into digital samples in accordance with the clock signals; an adjunct processing module connected and configured to match filter digital samples output by the analog-to-digital converter and derive an interpolation coefficient vector from the clock signals and match-filtered digital samples; delay circuitry connected and configured to delay the digital samples output by the analog-to-digital converter and received directly by the delay circuitry without match filtering; an interpolation filter connected and configured to convolve digital samples output by the delay circuitry with the interpolation coefficient vector output by the adjunct processing module to remove local clock-induced jitter from the digital samples output by the delay circuitry; and a wideband receiver processing module connected and configured to process digital samples received from the interpolation filter.

Another aspect of the subject matter disclosed in some detail below is a system comprising a wideband receiver system, a plurality of transmitter systems, and an adjunct transmitter system. Each transmitter system comprises a respective waveform generator and a respective transmit antenna configured to transmit a respective signal of interest based on waveforms generated by the respective waveform generator. The adjunct transmitter system comprises a remote clock having a high stability, an adjunct waveform generator, and an adjunct transmit antenna configured to transmit adjunct signals based on adjunct waveforms generated by the adjunct waveform generator. The wideband receiver system comprises: a receive antenna; a local clock configured to generate clock signals and having a stability lower than the high stability of the remote clock; an analog-to-digital converter connected and configured to convert adjunct signals and signals of interest received by the receive antenna from the transmit antenna and adjunct transmit antenna into digital samples in accordance with the clock signals from the local clock; an adjunct processing module connected and configured to match filter digital samples of the adjunct signals and derive an interpolation coefficient vector from the clock signals and match-filtered digital samples; delay circuitry connected and configured to delay the digital samples output by the analog-to-digital converter and received directly by the delay circuitry without match filtering; an interpolation filter connected and configured to convolve digital samples output by the delay circuitry with the interpolation coefficient vector output by the adjunct processing module to remove local clock-induced jitter from the digital samples output by the delay circuitry; and a wideband receiver processing module connected and configured to process digital samples received from the interpolation filter.

A further aspect of the subject matter disclosed in some detail below is a method of operating a wideband receiver, the method comprising: receiving analog signals using an antenna; generating clock signals using a local clock; converting analog signals received by the antenna into digital samples in accordance with the clock signals generated by the local clock; match filtering digital samples to extract digital samples of adjunct signals having known frequencies; deriving an interpolation coefficient vector from the clock signals and match-filtered digital samples; delaying digital samples not match filtered; convolving delayed digital samples with the interpolation coefficient vector to remove local clock-induced jitter from the delayed digital samples; and processing digital samples from which local clock-induced jitter has been removed.

Other aspects of systems and methods which use adjunct signals from a remote highly stable clock to enhance performance of a digital wideband receiver equipped with a less stable local clock to enhance the performance of a digital wideband receiver having a less stable local clock are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Figure 1:
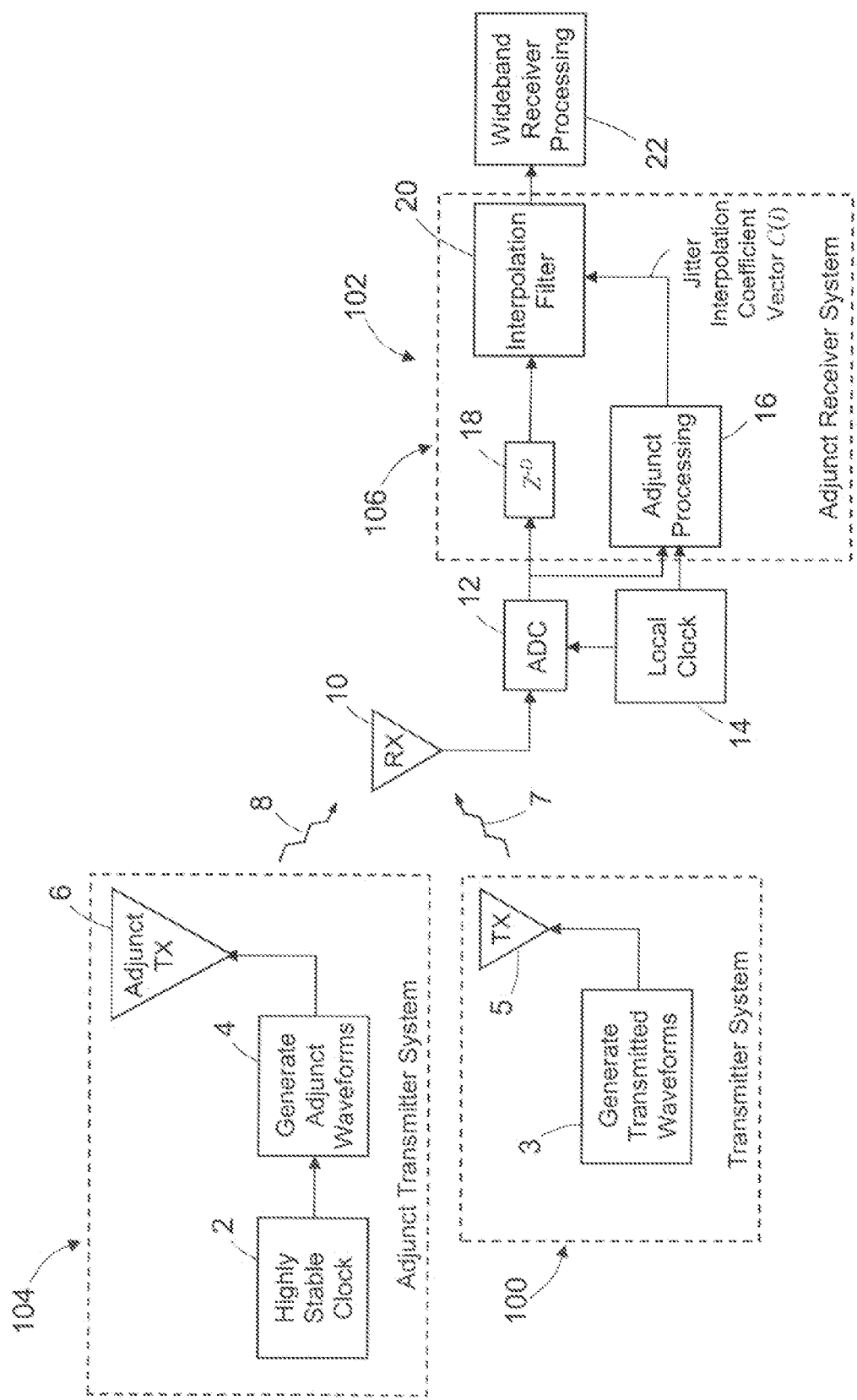
FIG. 1 is a block diagram identifying some components of an adjunct signal system in accordance with one embodiment.

Illustrative embodiments of systems and methods which use adjunct signals from a remote highly stable clock to enhance performance of a digital wideband receiver equipped with a less stable local clock are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Clock jitter has a serious effect on all-digital wideband receivers due to the clock jitter affecting the sample rate of the input ADCs. In particular, in applications such as for electronic surveillance, digital wideband receivers that receive weak signals in close proximity to strong interferers (for example, radar returns intermixed with direct radar illumination and communications signals) are sensitive to close-in phase noise. Also, high-symbol-rate communications applications that use higher-order modulation types, such as quadrature amplitude modulation and M-ary phase modulations (a type of digital modulation where instead of transmitting one bit at a time, two or more bits are transmitted simultaneously), are susceptible to close-in phase noise.

High-speed ADCs typically use sample-and-hold circuits. A sample-and-hold circuit is an analog device that samples (captures) the voltage of a continuously varying analog signal at an instant in time and holds its value at a constant level for a specified minimum period of time. A typical sample-and-hold circuit stores electric charge in a capacitor and contains at least one switching device (such as a field effect transistor) and one operational amplifier. When the switch of the sample-and-hold circuit is closed, the input of the ADC is connected to the capacitor. At the instant when the switch is opened one half clock cycle later, the voltage on the capacitor is recorded. Variation in the time at which the switch is opened and closed are known as jitter. This jitter results in an error voltage that is proportional to the magnitude of the jitter and the input signal slew rate. Therefore, the greater the input frequency and amplitude, the higher the ADC sample error will be.

The theoretical limit on the signal-to-noise ratio (SNR) resulting from clock jitter may be characterized by the following equation:

$$SNR(dBFS) = -20 \log(2\pi f_{in} \sigma)$$

where $f_{in}$ is the input frequency and $\sigma$ is the jitter in RMS seconds. The jitter-related noise power is proportional to the input power in decibels relative to full scale (dBFS). As the input level is raised or decreased, the noise component related to jitter changes accordingly. To calculate the total SNR degradation ($SNR_{degrad}$), the jitter noise power ($SNR_{jitter}$) is added to the SNR of the ADC ($SNR_{ADC}$) as follows:

$$SNR_{degrad}(dBFS) = 10 \log(10^{-SNR_{ADC}/10} + 10^{-SNR_{jitter}/10})$$

The innovative method proposed herein is able to reduce clock jitter by using several known signal tones which are created by a highly stable oscillator, transmitted by a clock signal transmitter, and then received by a wideband receiver equipped with a less stable local clock that drives the receiver ADC. As used herein, the term "stability" indicates how well an oscillator can produce the same time or frequency offset over a given time interval. In the system proposed herein, the stability of the remote highly stable clock is greater than the stability of the less stable local clock.

FIG. 1 shows an architecture that includes at least one transmitter system 100, at least one wideband receiver system 102, and one adjunct transmitter system 104. The overall system may include one or more separate transmitter systems that create the original signals 7 that are desired to be transmitted and subsequently received and processed by one or more wideband receiver systems. Each transmitter system 100 includes a waveform generator 3 and a transmit antenna 5 which transmits signals 7 having the waveform generated by the waveform generator 3. The adjunct transmitter system 104 includes a remote clock 2 that outputs highly stable clock signals, an adjunct waveform generator 4 that generates waveforms having a period dictated by the clock signals output by the remote clock 2, and an adjunct transmit antenna 6 that transmits adjunct signals 8 having the waveform generated by adjunct waveform generator 4.

Each wideband receiver system 102 receives signals 7 transmitted by each transmitter system 100 and adjunct signals 8 transmitted by the adjunct transmitter system 104. Signals 7 and adjunct signals 8 are received by a receive antenna 10 of the wideband receiver system 102. The wideband receiver system 102 further includes an ADC 12 which samples the received signals in accordance with a clock signal received from a local clock 14. The local clock 14 has a stability which is less than the stability of the remote clock 2. The wideband receiver system 102 further includes a wideband receiver processing module 22 which is configured to process digital samples.

The wideband receiver system 102 depicted in FIG. 1 further includes an adjunct receiver system 106 which is configured to adjust the samples output by the ADC 12 in order to improve the received signal SNRs. This is accomplished by reducing the sample jitter due to local clock 14. In accordance with one embodiment, the adjunct receiver system 106 includes adjunct processing module 16 which receives the samples output by ADC 12. The adjunct processing module 16 is configured to generate an interpolation coefficient vector C(i). The adjunct receiver system 106 further includes delay circuitry 18 which is configured to delay each sample value by D clock periods, where D is a positive integer. For example, the delay circuit may be a shift register or other memory element which serves to successively delay each sample value by one clock period D times to achieve a delay D. The adjunct receiver system 106 further includes an interpolation filter 20 that receives a vector of delayed sample values from the delay circuitry 18 and convolves the vector of delayed sample values with the interpolation coefficient vector C(i) received from the adjunct processing module 16.

The adjunct transmitter system 104 has a highly stable remote clock 2 that is used to generate adjunct signals 8 that are known to the wideband receiver system 102. These signals could in fact simply be tones of different frequencies that cover bands of interest to the wideband receivers present in the transmission area. These adjunct signals 8 are transmitted and then received by all the receivers in the coverage area of this transmission.

In each wideband receiver, the ADC 12 digitizes the received signals, driven by the local clock 14 with some amount of clock jitter that needs to be corrected. Without the adjunct receiver system 106, these ADC samples would be fed directly into the wideband receiver processing module 22 and processed with clock jitter present.

In accordance with the innovative technology proposed in this disclosure, the digital samples of each of these adjunct signals are processed by adjunct processing module 16 and an interpolation coefficient vector C(i) is produced on every sample clock with some fixed delay D. This is further described below with reference to FIG. 3. Separately each sample of the received signal is delayed by D clocks and then filtered with an interpolation filter using the interpolation coefficient vector C(i). The filtered samples with reduced jitter are then sent to the wideband receiver processing module 22, replacing the original jittered samples.

Figure 2:
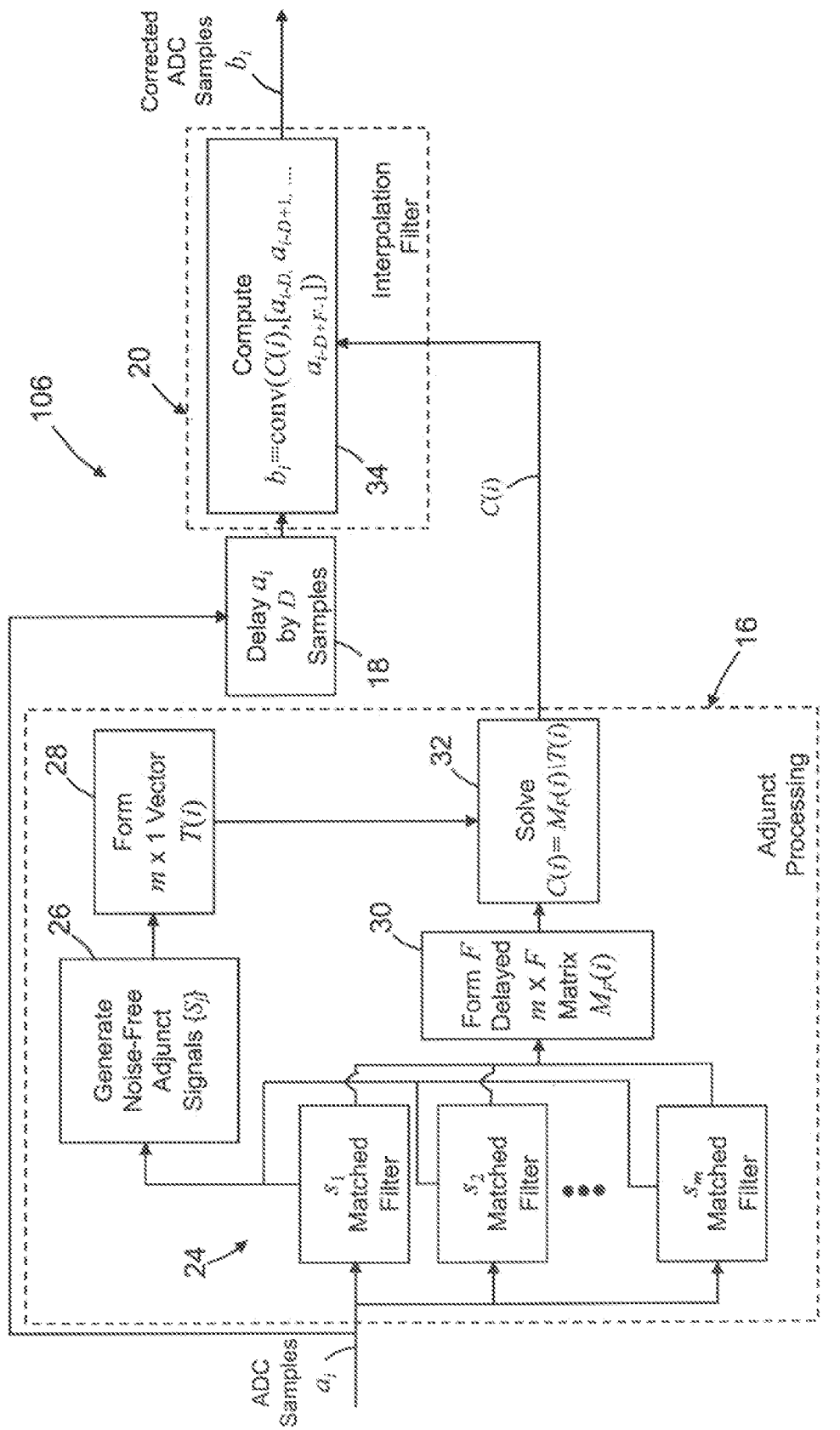
FIG. 2 is a flowchart identifying steps of a method for processing adjunct signals in accordance with one embodiment.

FIG. 2 is a flowchart identifying steps of a method for processing adjunct signals performed by an adjunct receiver system 11 in accordance with one embodiment. The adjunct processing module 16 includes a plurality (m in number) of matched filters 24 (having filter length F) which are respectively configured to convolve the received signal with a conjugated time-reversed version of a respective known adjunct signal $s_j$, where j=1, 2, . . . , m. The ADC samples $\{a_i\}$ are input to each matched filter 24 that is matched to the j-th known adjunct signal $s_j$.

The outputs from matched filters 24 are received (noisy filtered) versions $MF_{s_j}(a_i)$ of each adjunct signal that is a noisy version $\hat{s}_j$ of $s_j$. The noisy received adjunct signals $\hat{s}_j(i)$ and their F delayed values are used to form an m×F matrix $M_F(i)$ (step 30 in FIG. 2) as $$M_F(i) = \begin{bmatrix} \hat{s_1}(i-F+1) & \hat{s_1}(i-F+2) & \cdots & \hat{s_1}(i) \\ \hat{s_2}(i-F+1) & \hat{s_2}(i-F+2) & \cdots & \hat{s_2}(i) \\ \vdots & \vdots & \vdots & \vdots \\ \hat{s_m}(i-F+1) & \hat{s_m}(i-F+2) & \cdots & \hat{s_m}(i) \end{bmatrix}$$

At the same time, a timing signal is created from the matched filters 24, as will be described in more detail below with reference to FIG. 3. The timing signal is used by a noise-free adjunct signal generation module 26 to generate m noise-free synchronized matching adjunct signal values $S_j$, which are formed into a m×1 vector T(i) at time i (step 28 in FIG. 2) for use in processing. The noise-free adjunct signals generated by noise-free adjunct signal generation module 26 are matched to take into account processing delays so that the interpolation coefficient vector C(i) of length F will be computed correctly (i.e., $M_F(i)$ is matched to T(i) in time).

A system of linear equations ($M_F(i)C(i)=T(i)$) is then solved to derive the interpolation coefficient vector C(i) (step 32 in FIG. 2). This can be done in different ways depending on the vector length m and filter length F. If m=F, this can be done directly with Gaussian elimination. However, often m>F and a least squares approach (denoted with Matlab notation $M_F(i)\backslash T(i)$) is possible (and implementable in hardware in a pipelined fashion). If there is only one adjunct signal, the operation $M_F(i)\backslash T(i)$ with m=1 is called deconvolution and can be computed using fast Fourier transforms. The design choices of m and F are made depending on the expected local clock jitter. The interpolation coefficient vector C(i) is output to the interpolation filter 20.

Still referring to FIG. 2, concurrently with adjunct processing, the ADC samples $\{a_i\}$ are input to delay circuitry 18, which delays each sample value by D samples. The interpolation filter 20 receives the delayed samples from delay circuitry 18 and convolves the vector of delayed sample values with the interpolation coefficient vector C(i). The convolution of interpolation coefficient vector $\{C(i)\}_{i=1, 2, \ldots, F}$ with a delayed sample vector $[a_{i-D}, a_{i-D+1}, \ldots, a_{i-D+F-1}]$ then interpolates the jittered samples (step 34 in FIG. 2) to form corrected ADC values b. These corrected ADC values represent sample values without local clock-induced jitter.

Figure 3:
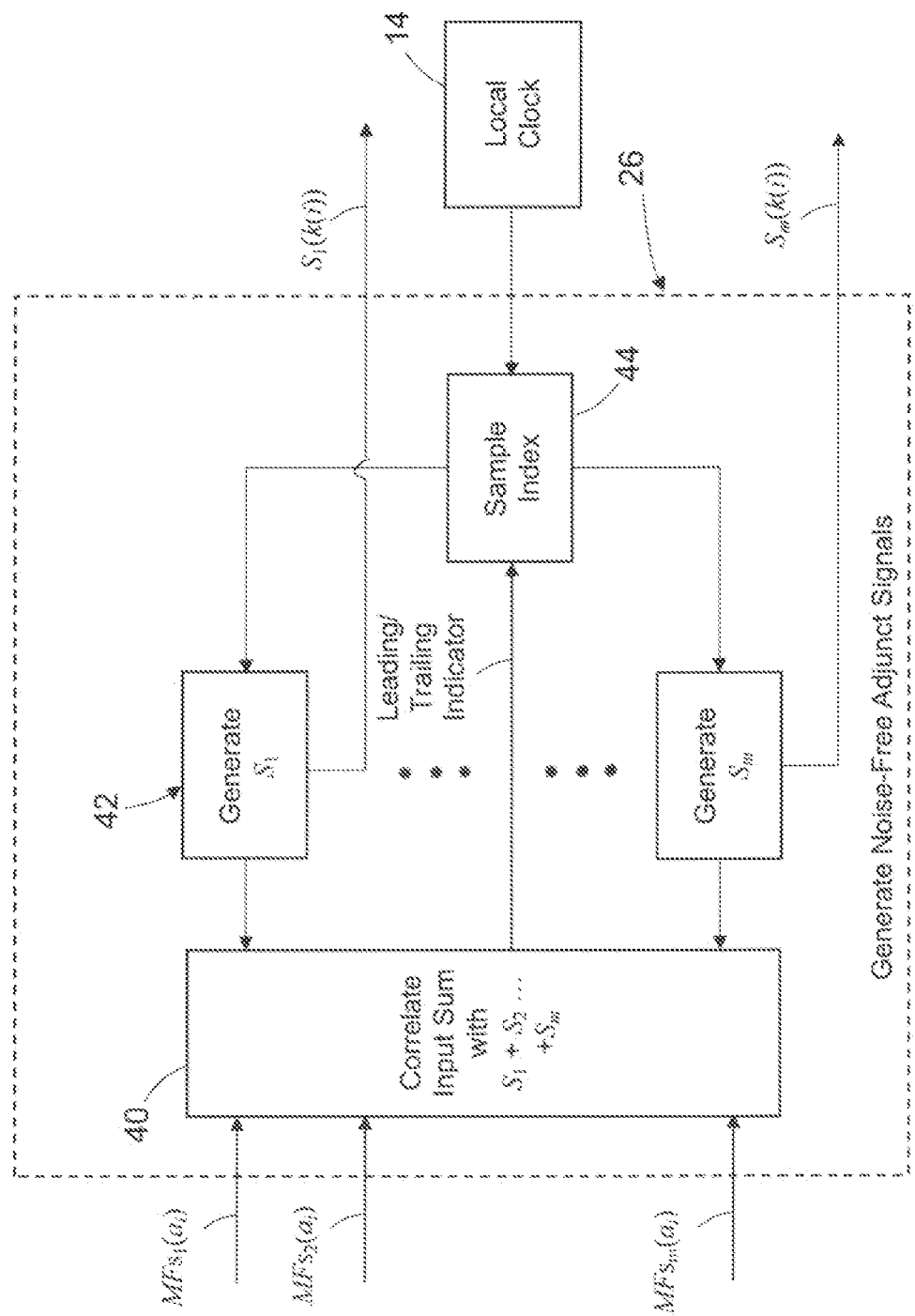
FIG. 3 is a flowchart identifying steps of a process for generating noise-free adjunct signals that are synchronized with incoming adjunct signals

The process of generating noise-free adjunct signals that are synchronized with the incoming adjunct signals is shown in FIG. 3. The output of each matched filter 24 (see FIG. 2) for each adjunct signal $s_j$ is a noisy version $\hat{s}_j$ of the respective adjunct signal. The noisy versions of the adjunct signals (denoted by $\hat{s}_j=MF_j(a_i)$ in FIG. 3) are input into a correlator 40 that is configured to perform a correlation process. The correlation process tests each sample delay between the sum of the matched filter outputs and the sum of the locally generated noise-free adjunct signals $S_1+S_2+\ldots+S_m$ generated by a plurality of adjunct signal generators 42. These locally generated noise-free adjunct signals are jittered from the local clock 14 (as will be explained in more detail below with reference to FIG. 3). The correlator 40 compares the jittered locally generated adjunct signals with the remotely generated adjunct signals to get rid of the jitter. The output from the correlator 40 is a leading/trailing indicator which is input to a signal index process 44. The leading/trailing indicator is indicative of the degree of correlation of a sum of the adjunct signals output by the matched filters 24 (see FIG. 2) and a sum of the noise-free adjunct signals generated by the adjunct signal generators 42. More specifically, the leading/trailing indicator is the location of the correlation peak with respect to its center and indicates how many samples the sum of noise-free adjunct signals $S_1+S_2+\ldots+S_m$ is from alignment with the input sum from matched filters 24.

Each local signal $S_j$ (which is identical to the corresponding remote adjunct signal $s_j$, but generated at a different delay and with local clock-induced jitter) is generated via any standard method that uses a single index to generate the remote adjunct signals $s_j$. For example, adjunct signal generators 42 could be implemented with a plurality of j lookup tables (call the lookup table $LUT_j$ for signal $s_j$) and a common index (call it k) for all of the lookup tables. Each lookup table $LUT_j$ is of length $P_j$, which is the period of $s_j$ and $S_j$. In this case, generating $S_j$ is equivalent to computing $$S_j(k)=LUT_j(k \bmod P_j).$$

The signal index process 44 receives clock signals from the local clock 14 and produces an index k=k(i) at sample time i based on an offset from the leading/trailing indicator. The outputs from adjunct signal generators 42 consist of the samples of the noise-free signals $S_j(k(i))$, denoted by the set $\{S_j(i)\}$ at time i that is used to create the vector of length m denoted by T(i) at each sample time (see step 28 in FIG. 2).

Several system design considerations are relevant to the adjunct signal processing disclosed herein. The design process includes determining answers to the following questions: (1) How stable is the chosen adjunct clock required to be? (2) What should the frequency and bandwidth (and other characteristics) of these adjunct signals be? (3) How many adjunct signals should be utilized? (4) How long should the interpolation filter be?

The first question can be answered by considering the characteristics of the ADC being used and its specification with regard to jitter degradation of SNR as a function of input frequency, together with performance simulations that are specific to the application.

The adjunct signals can be chosen freely, but typical implementation considerations require generating very simple signals with narrow bandwidths so that the adjunct signals do not affect reception of the actual transmitted signals of interest. Thus, a typical choice would be tones. The use of tones is assumed in the following description. The frequency and frequency range of the tones is determined by availability of licensed spectrum and the frequency of the signals of interest, as well as any interfering signals. Also, the frequencies should be as close as possible to the frequencies of the signals of interest. This will ensure that the interpolation filter 20 is based on an almost identical receiver environment. One common application would be to place the tones directly within the transmitted signal bandwidth (they would interfere directly with the signal of interest) and use signal processing to filter the tones out of the received signal.

The number (m) of adjunct signals to be employed depends on how much of the wideband receiver frequency range needs to be covered, what the SNR of each received adjunct signal is, how much clock jitter needs to be eliminated, etc. These factors may be determined by simulating the system.

The interpolation filter length is determined by the autocorrelation width of the clock jitter and the dynamics of the clock jitter and again may be determined by a system simulation.

Figure 4:
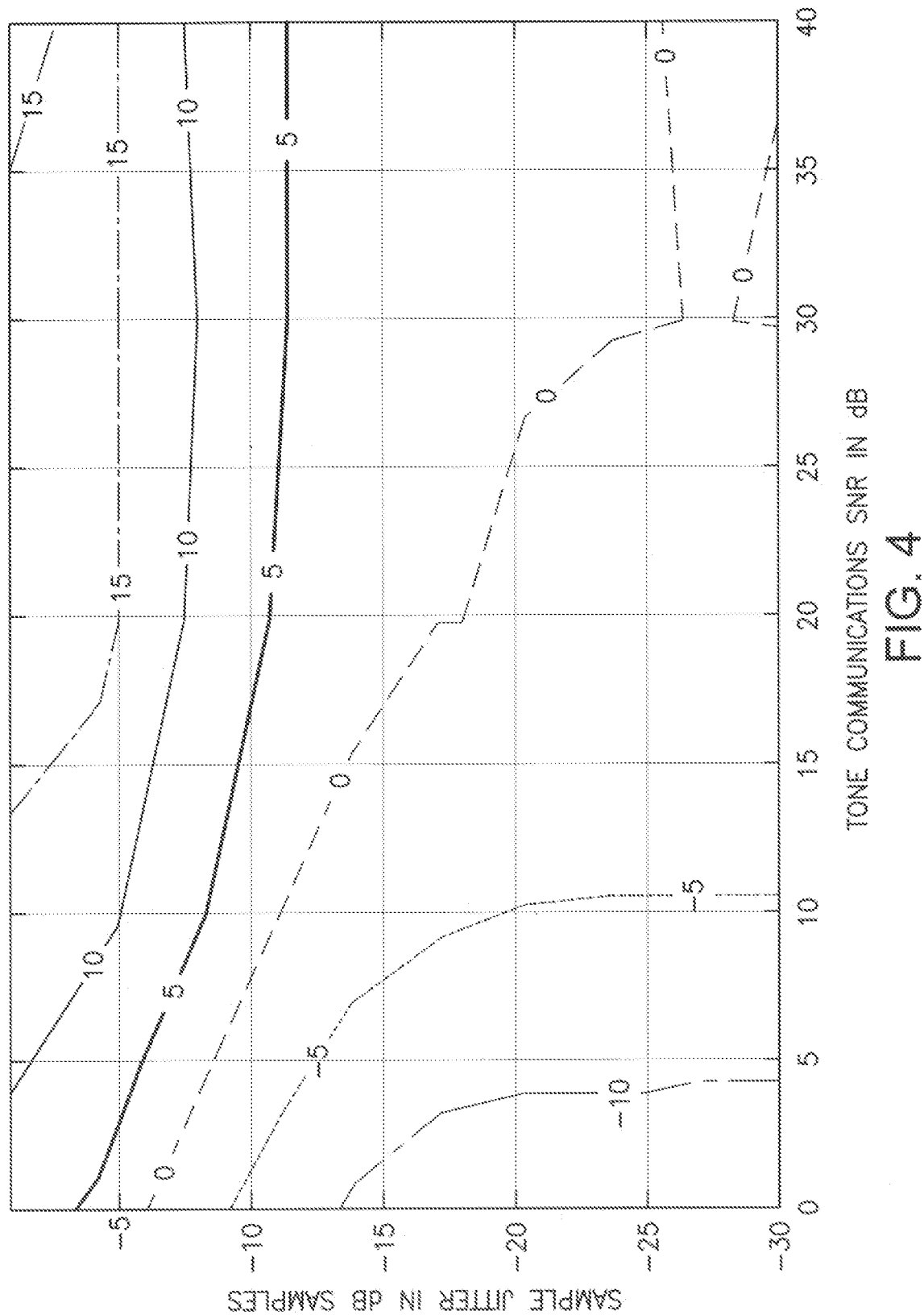
FIG. 4 is a graph of sample jitter versus SNR of a 20-dB signal in a simulated 10-tone wideband receiver configured to process adjunct tones.
Figure 5:
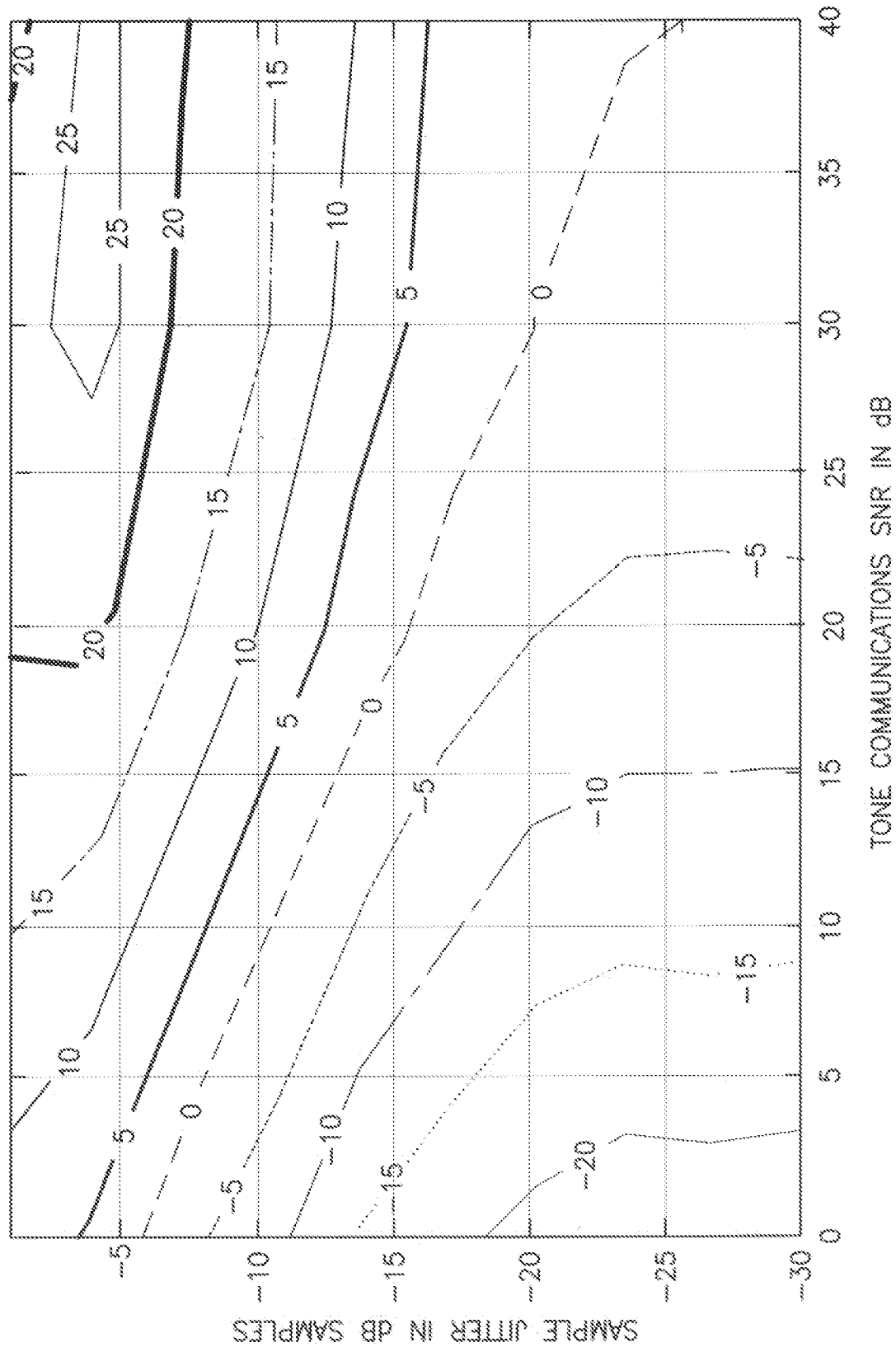
FIG. 5 is a graph of sample jitter versus SNR of a 30-dB signal in a simulated 10-tone wideband receiver configured to process adjunct tones.
Figure 6:
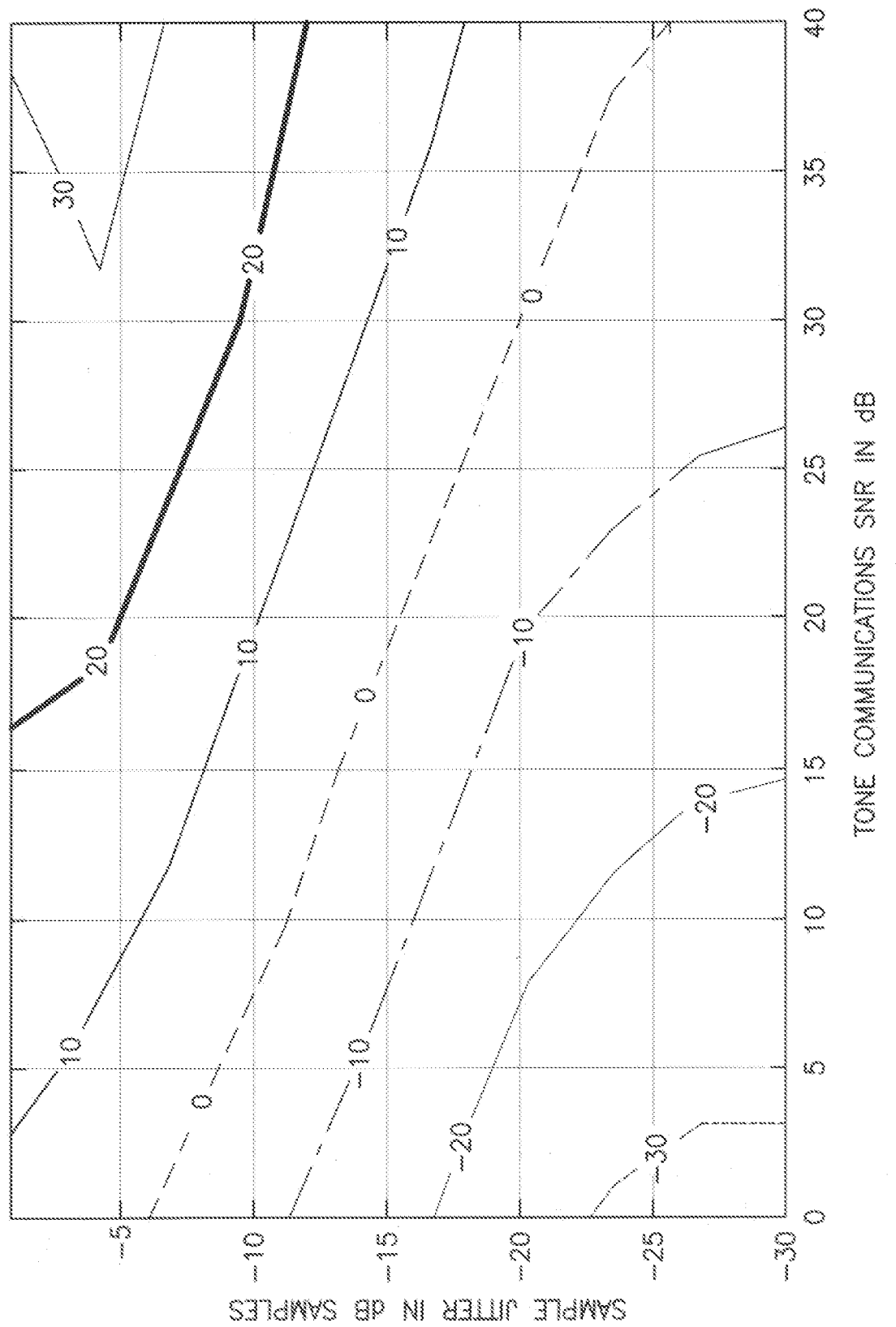
FIG. 6 is a graph of sample jitter versus SNR of a 40-dB signal in a simulated 10-tone wideband receiver configured to process adjunct tones.

The method of processing adjunct signals proposed herein has been implemented and simulated under different conditions to determine how much improvement can be expected in the SNR of incoming signals into a wideband receiver under challenging clock phase noise. FIGS. 4, 5, and 6 show the results for average incoming signals across the receiver bandwidth with 20 dB, 30 dB, and 40 dB respectively of SNR. The simulation assumed a filter length of five samples with ten evenly spaced adjunct tonal signals used as references. Two conclusions can be drawn from the simulation results depicted in FIGS. 4-6.

First, the upper triangular region of these plots is where SNR gains are made. This region either uses adjunct tonal signals with high SNR or higher values of jitter. Since the amount of local clock jitter is known, the SNR range where the benefits of the adjunct signal processing disclosed herein accrue may be readily determined. This determines a design region where the method has the described benefits.

Second, if jitter is very low, there are no benefits to the approach proposed herein and SNR can even decrease. However, low jitter means that the reduction in signal SNR is also very low and so the benefits identified herein would not be needed.

Thus, the system disclosed herein includes the following advantageous features: (1) Adjunct signals created from a stable clock are transmitted to a collection of wideband receivers. (2) These received adjunct signals are used to adjust the signal samples in the receiver in order to improve signal SNR. (3) The system enables remote transfer of the benefits of a highly stable, expensive, fragile clock simultaneously to a collection of wideband receivers equipped with inexpensive, robust clocks. These features provide many benefits, including reduced size, weight, power, and cost and performance advantages for any wideband all-digital receiver, especially for the reception of radar and communication signals under difficult interference conditions.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods which use adjunct signals from a remote highly stable clock to enhance performance of a digital wideband receiver equipped with a less stable local clock have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor or controller, such as a general-purpose central processing unit, a microcontroller, a reduced instruction set computer processor, an application-specific integrated circuit, a programmable logic circuit, a field-programmable gate array, a digital signal processor, and/or any other data processing circuitry capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. For example, such a processing or computing device may be configured (e.g., programmed in the case of software or constructed in the case of hardware) to perform the computations represented by steps 28, 30 and 32 shown in FIG. 2 or the computations represented by correlator 40 and step index process 44 shown in FIG. 3.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A wideband receiver comprising:
   an antenna;
   a local clock configured to generate clock signals;
   an analog-to-digital converter connected and configured to convert analog signals received by the antenna into digital samples in accordance with the clock signals;
   an adjunct processing module connected and configured to match filter the digital samples output by the analog-to-digital converter and derive an interpolation coefficient vector from the clock signals and the match-filtered digital samples;
   delay circuitry connected and configured to delay the digital samples output by the analog-to-digital converter and received directly by the delay circuitry without match filtering;
   an interpolation filter connected and configured to convolve the digital samples output by the delay circuitry with the interpolation coefficient vector output by the adjunct processing module to remove local clock-induced jitter from the digital samples output by the delay circuitry; and
   a wideband receiver processing module connected and configured to process digital samples received from the interpolation filter.

2. The wideband receiver as recited in claim 1, wherein the adjunct processing module comprises:
   a plurality of matched filters connected and configured to pass digital samples representing adjunct signals received from the analog-to-digital converter; and
   a noise-free adjunct signal generation module that is connected to receive the clock signals from the local clock and the digital samples representing the adjunct signals output by the matched filters and configured to generate noise-free adjunct signals which are synchronized with the adjunct signals.

3. The wideband receiver as recited in claim 2, wherein the adjunct processing module further comprises a processor or other circuitry configured to perform operations comprising:
   forming a vector T(i) including the noise-free adjunct signals;
   forming a matrix MF(i) including the digital samples representing adjunct signals output by the matched filters; and
   solving a system of linear equations MF(i)C(i)=T(i) to derive the interpolation coefficient vector C(i).

4. The wideband receiver as recited in claim 2, wherein the noise-free adjunct signal generation module comprises:
   a plurality of noise-free adjunct signal generators configured to generate the noise-free adjunct signals; and
   a correlator which is connected and configured to determine a degree of correlation of a sum of the adjunct signals output by the matched filters and a sum of the noise-free adjunct signals generated by the noise-free adjunct signal generators and output a leading/trailing indicator indicative of the degree of correlation.

5. The wideband receiver as recited in claim 4, wherein the noise-free adjunct signal generation module further comprises a processor or other circuitry configured to perform a signal index process that receives the clock signals from the local clock and produces an index k(i) at sample time i based on an offset from the leading/trailing indicator.

6. The wideband receiver as recited in claim 4, wherein the noise-free adjunct signal generators are lookup tables.

7. A system comprising a wideband receiver system, a plurality of transmitter systems, and an adjunct transmitter system,
   wherein each of the plurality of transmitter systems comprises a respective waveform generator and a respective transmit antenna configured to transmit a respective signal of interest based on waveforms generated by the respective waveform generator;
   wherein the adjunct transmitter system comprises a remote clock having a high stability, an adjunct waveform generator, and an adjunct transmit antenna configured to transmit adjunct signals based on adjunct waveforms generated by the adjunct waveform generator; and
   wherein the wideband receiver system comprises:
   a receive antenna;
   a local clock configured to generate clock signals and having a stability lower than the high stability of the remote clock;
   an analog-to-digital converter connected and configured to convert the adjunct signals and the respective signals of interest received by the receive antenna from the respective transmit antenna of each of the plurality of transmitter systems and adjunct transmit antenna into digital samples in accordance with the clock signals from the local clock;
   an adjunct processing module connected and configured to match filter the digital samples of the adjunct signals and derive an interpolation coefficient vector from the clock signals and the match-filtered digital samples;

delay circuitry connected and configured to delay the digital samples output by the analog-to-digital converter and received directly by the delay circuitry without match filtering;

an interpolation filter connected and configured to convolve the digital samples output by the delay circuitry with the interpolation coefficient vector output by the adjunct processing module to remove local clock-induced jitter from the digital samples output by the delay circuitry; and a wideband receiver processing module connected and configured to process the digital samples received from the interpolation filter.

8. The system as recited in claim 7, wherein the adjunct processing module comprises:

a plurality of matched filters connected and configured to pass the digital samples representing the adjunct signals received from the analog-to-digital converter; and a noise-free adjunct signal generation module that is connected to receive the clock signals from the local clock and the digital samples representing the adjunct signals output by the matched filters and configured to generate noise-free adjunct signals which are synchronized with the adjunct signals.

9. The system as recited in claim 8, wherein the adjunct processing module further comprises a processor or other circuitry configured to perform operations comprising:

forming a vector T(i) including the noise-free adjunct signals;

forming a matrix MF(i) including the adjunct signals output by the matched filters; and solving a system of linear equations MF(i)C(i)=T(i) to derive the interpolation coefficient vector C(i).

10. The system as recited in claim 8, wherein the noise-free adjunct signal generation module comprises:

a plurality of noise-free adjunct signal generators configured to generate the noise-free adjunct signals; and a correlator which is connected and configured to determine a degree of correlation of a sum of the adjunct signals output by the matched filters and a sum of the noise-free adjunct signals generated by the noise-free adjunct signal generators and output a leading/trailing indicator indicative of the degree of correlation.

11. The system as recited in claim 10, wherein the noise-free adjunct signal generation module further comprises a processor or other circuitry configured to perform a signal index process that receives the clock signals from the local clock and produces an index k(i) at sample time i based on an offset from the leading/trailing indicator.

12. The system as recited in claim 10, wherein the noise-free adjunct signal generators are lookup tables.

13. The system as recited in claim 7, wherein the adjunct signals transmitted by the adjunct transmit antenna are tones.

14. The system as recited in claim 7, wherein frequencies of the adjunct signals are the same or nearly the same as frequency of respective signals of interest transmitted by each of the plurality of transmitter systems.

15. A method of operating a wideband receiver, the method comprising:

receiving analog signals using an antenna;

generating clock signals using a local clock;

converting the analog signals received by the antenna into digital samples in accordance with the clock signals generated by the local clock;

match filtering digital samples to extract the digital samples of adjunct signals having known frequencies;

deriving an interpolation coefficient vector from the clock signals and the match-filtered digital samples;

delaying digital samples;

convolving the delayed digital samples with the interpolation coefficient vector to remove local clock-induced jitter from the delayed digital samples; and processing the digital samples from which the local clock-induced jitter has been removed.

16. The method as recited in claim 15, wherein deriving the interpolation coefficient vector further comprises forming a vector T(i) including noise-free adjunct signals;

forming a matrix MF(i) including the adjunct signals output by the matched filters; and solving a system of linear equations MF(i)C(i)=T(i) to derive the interpolation coefficient vector C(i).

17. The method as recited in claim 15, wherein deriving the interpolation coefficient vector comprises generating noise-free adjunct signals which are synchronized with the adjunct signals.

18. The method as recited in claim 15, wherein deriving the interpolation coefficient vector comprises:

generating noise-free adjunct signals;

determining a degree of correlation of a sum of the match-filtered digital samples of adjunct signals and a sum of the noise-free adjunct signals; and outputting a leading/trailing indicator indicative of the degree of correlation.

19. The method as recited in claim 18, wherein deriving the interpolation coefficient vector further comprises performing a signal index process that receives the clock signals from the local clock and produces an index k(i) at sample time i based on an offset from the leading/trailing indicator.

20. The method as recited in claim 15, wherein the adjunct signals are tones.

* * * * *